United States Patent [19]

Hart, Jr.

[11] Patent Number: 5,016,893
[45] Date of Patent: May 21, 1991

[54] COLLAPSIBLE SUPPORT AND TRANSPORT STAND FOR PERSONAL WATERCRAFT

[76] Inventor: Charles R. Hart, Jr., 12400 Wilshire Blvd. #450, Los Angeles, Calif. 90025

[21] Appl. No.: 479,048

[22] Filed: Feb. 12, 1990

[51] Int. Cl.$^5$ .............................................. B62B 1/12
[52] U.S. Cl. ...................................... 280/35; 211/195; 248/129; 248/173; 248/439; 280/9; 280/414.2; 280/39
[58] Field of Search .................... 280/9, 10, 39, 656, 280/414.1, 414.2, 414.3, 35; 211/195, 189, 198, 208; 248/129, 172, 173, 439

[56] References Cited

U.S. PATENT DOCUMENTS

| | | | |
|---|---|---|---|
| 1,378,598 | 5/1921 | Meyers | 280/39 X |
| 1,462,133 | 7/1923 | Glock | 280/39 |
| 2,716,439 | 8/1955 | Feist | 280/9 X |
| 2,970,846 | 2/1961 | Boston | 280/414.2 X |
| 3,955,830 | 5/1976 | Hardwick | 280/414.3 |
| 4,029,227 | 6/1977 | Martinez | 280/414.3 |
| 4,139,208 | 2/1979 | Kaley et al. | 280/9 |
| 4,291,891 | 9/1981 | Blanchette | 280/9 |
| 4,822,065 | 4/1989 | Enders | 280/444.2 X |
| 4,936,595 | 6/1990 | Cunningham | 280/414.2 X |
| 4,946,180 | 8/1990 | Baer | 280/39 |

*Primary Examiner*—Andres Kashnikow
*Assistant Examiner*—Michael Mar
*Attorney, Agent, or Firm*—Kelly Bauersfeld & Lowry

[57] ABSTRACT

A collapsible support and transport stand is provided to receive a personal watercraft, such as a jet ski, water scooter, or the like from the back of a pick-up truck, for example, and to transport the personal watercraft into the water over typical beach terrain. The stand includes a cradle upon which the personal watercraft is supported and a plurality of telescoping legs which extend to a pair of skids having a plurality of spring biased retractable wheels. The telescoping legs are maintained in their support position transverse to the cradle by several telescoping cross members which extend therebetween. The cross members are adapted for disassembly to permit the legs to pivot to a stowed position underneath the cradle for ease of storage.

19 Claims, 4 Drawing Sheets

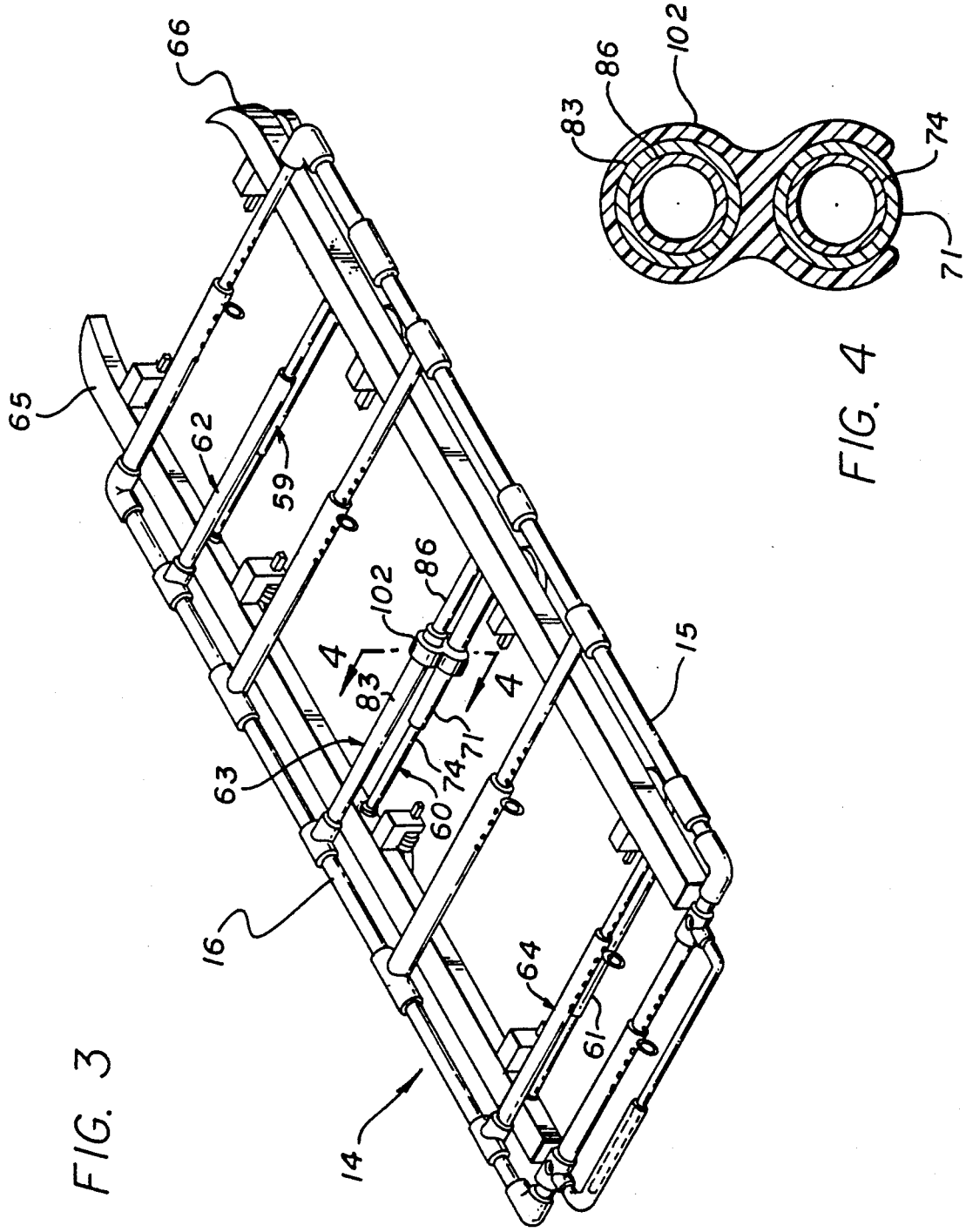

FIG. 5
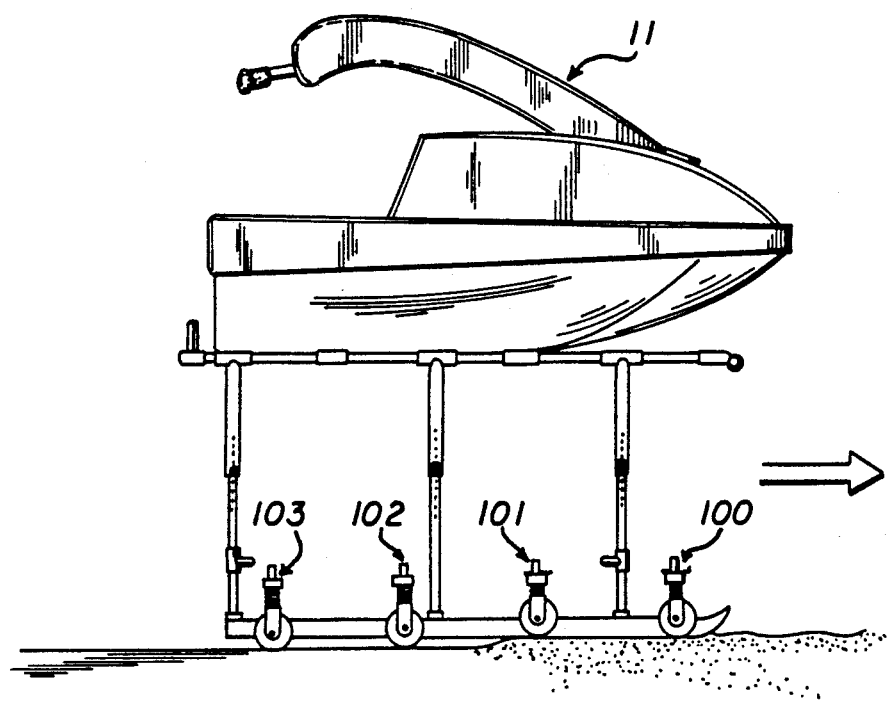
FIG. 6
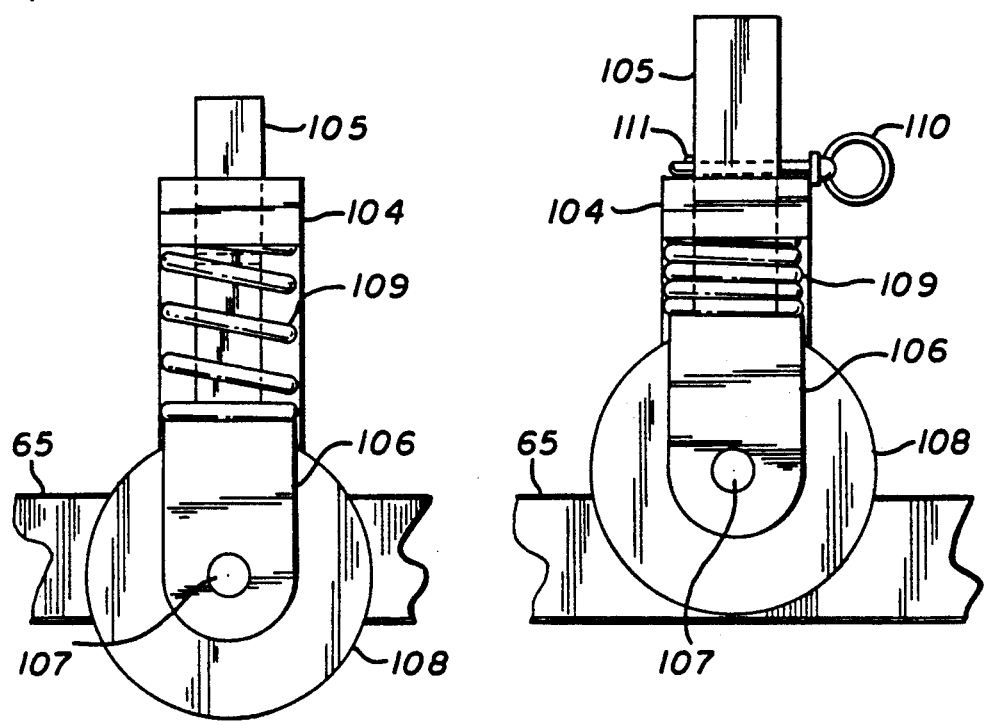
FIG. 7

COLLAPSIBLE SUPPORT AND TRANSPORT STAND FOR PERSONAL WATERCRAFT

BACKGROUND OF THE INVENTION

The invention relates generally to an improved support and transport stand for a personal watercraft such as a jet ski, water scooter, or the like. More particularly, this invention relates to a stand which is capable of receiving the personal watercraft from a motor vehicle such as a pick-up truck, transporting the personal watercraft to the water over typical beach terrain and yet is collapsible for convenient storage when not in use.

Personal watercraft have become increasingly popular in watersport activities throughout the world. Utilization of these watercraft, which can easily weigh several hundred pounds, can however be severely limited by the ability of an individual to easily transport such craft to the water in a convenient and economical fashion.

Specialized personal watercraft trailers have been developed to be towed behind motor vehicles. In most instances, however, these trailers represent single purpose devices much the same as a conventional boat trailer. As is the case with respect to a boat trailer, these personal watercraft trailers require a paved trailer ramp into the water in order to launch the personal watercraft.

In addition, wheeled carts have been developed to carry personal watercraft over the sand or other beach terrain to transport the personal watercraft into the water. These carts, which usually include balloon type tires, are normally low to the ground and still require that the personal water craft be lifted onto the cart from a primary carrier such as a pick-up truck or trailer.

Further, loading or unloading ramps have been designed to remove personal watercraft from the back of a pick-up truck and directly into the water. In addition, there are also numerous winch and frame designs to load, unload and/or support personal watercraft. None of these winch and frame designs, however, are designed to be moved over typical beach terrain.

There exists, therefore, a need for a support and transport stand for personal watercraft to easily remove the watercraft from the back of a pick-up truck and transport the watercraft into the water. Such a design should be lightweight and collapsible into a smaller configuration for storage when not in use. The present invention fulfills these needs and provides further related advantages.

SUMMARY OF THE INVENTION

In accordance with the invention, an improved support and transport stand for personal watercraft is provided with a cradle at an adjustable height in accordance with the vehicle from which the personal watercraft is to be retrieved, for example, the height of the tailgate of a pick-up truck. Thus, the personal watercraft can be easily removed from the pick-up truck to the cradle of the support and transport stand whose width is also adjustable to accommodate varying sizes of personal watercraft.

The support and transport stand is provided with skids having spring-biased retractable wheels so that the stand can be easily transported over both pavement, sand and other surfaces common to a beach environment. It should thus be a simple matter to move the stand, including the personal watercraft thereon, into the water such that the personal watercraft can be utilized therein.

The stand is of a lightweight tubular construction with many of its elements telescoping to not only provide adjustability but also to provide reduced space requirements for storage when the stand is not in use. The legs are not only telescoping but are also pivotable to a stowed position underneath the cradle of the stand.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is an enlarged perspective view of the collapsible support and transport stand of the present invention illustrating the support legs in a collapsed and stowed position underneath the cradle for the support and transport stand;

FIG. 4 is an enlarged transverse vertical section taken generally along the line 4—4 of FIG. 3;

FIG. 5 is a side view of the collapsible support and transport stand having a personal watercraft thereon and illustrating transport over an uneven beach surface;

FIG. 6 is an enlarged side view of a spring biased retractable wheel mounted on the skid for the collapsible support and transport stand with the wheel extending beyond the skid upon which it is mounted; and FIG. 7 is an enlarged side view of the spring-biased retractable wheel shown in a retracted position on the skid for the collapsible support and transport stand.

DETAILED DESCRIPTION OF THE PREFERRED EMBODIMENTS

Figure 1:
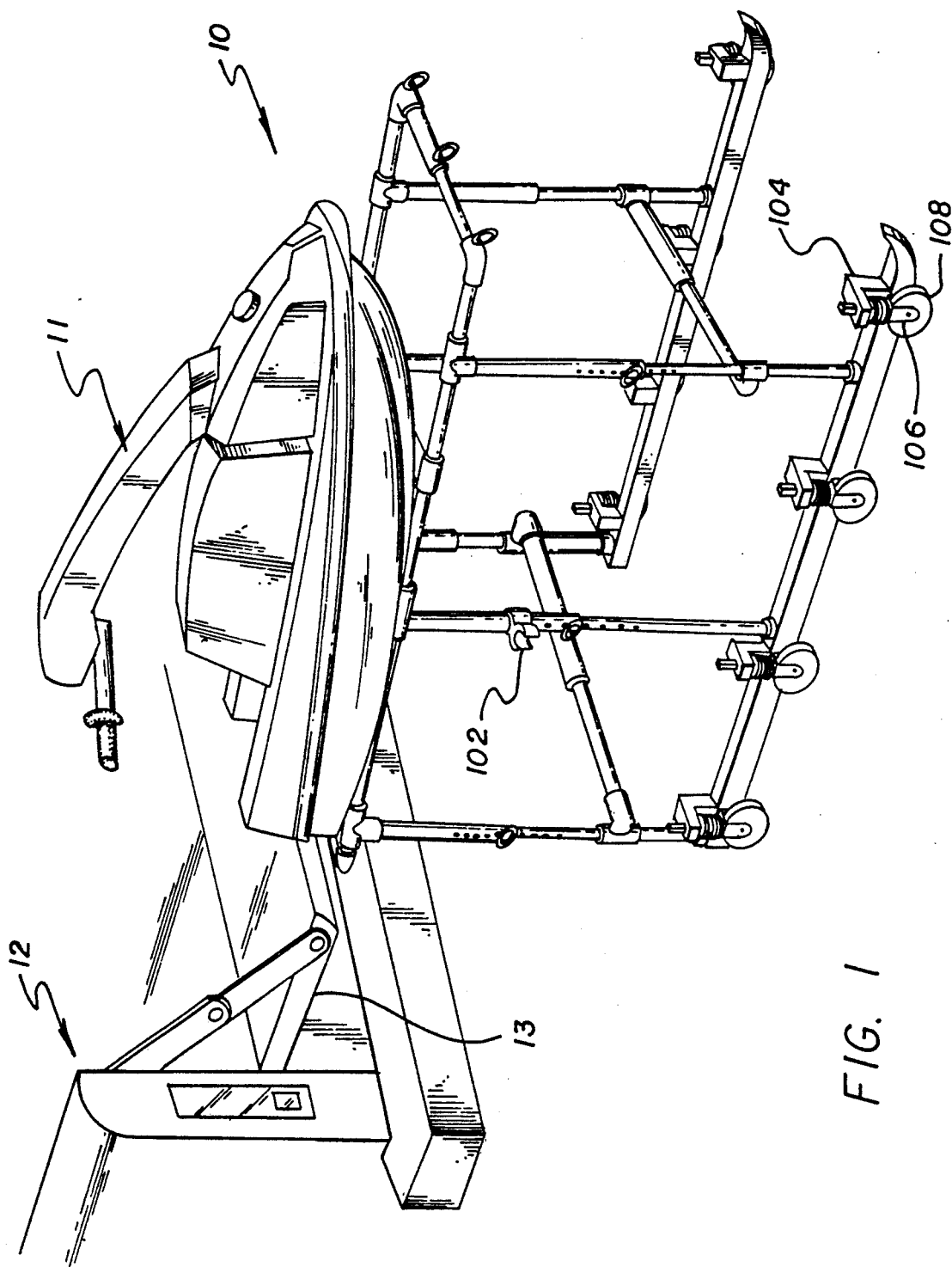
FIG. 1 is a perspective view illustrating the collapsible support and transport stand embodying its novel features and having a personal watercraft received thereon from the back of a pick-up truck.

As shown in the exemplary drawings, the collapsible support and transport stand for personal watercraft referred to generally by the reference numeral 10 is provided to receive and transport a personal watercraft 11 from the back of a motor vehicle such as a pick-up truck 12. As illustrated in FIG. 1, the stand 10 can be adjusted such that its height will be generally the same as the height of the tailgate 13 of the pick-up truck 12 for ease in transferring the watercraft 11 from the pick-up truck 12 to the stand 10.

Figure 2:
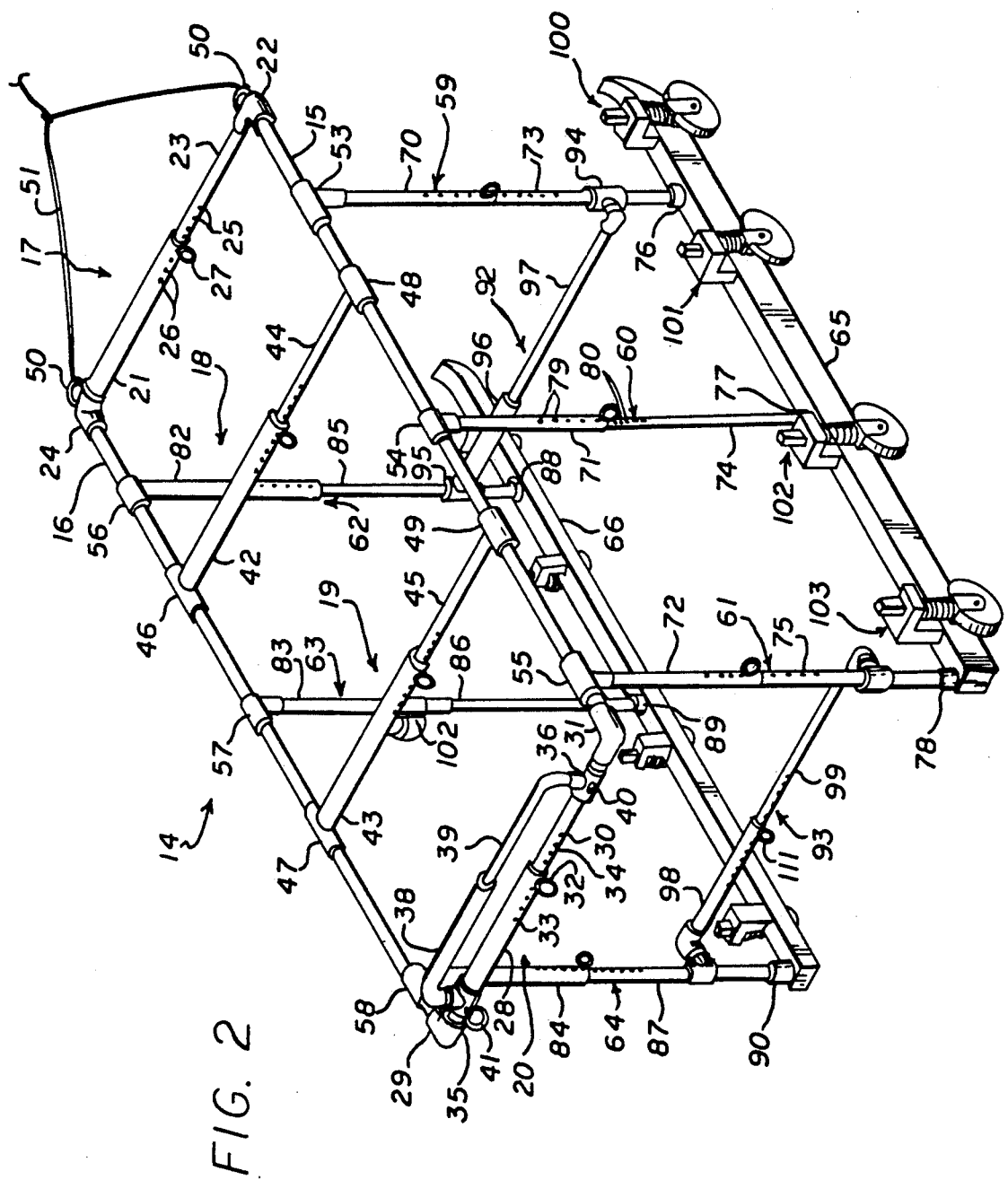
FIG. 2 is a perspective view of the collapsible support and transport stand of FIG. 1 shown without the personal watercraft thereon.

As best illustrated in FIG. 2, the top of the stand 10 generally comprises an elongated rectangular cradle 14 having a starboard frame member 15 and a port frame member 16 both of a tubular construction. A plurality of cross frame members 17, 18, 19, and 20, also of a tubular construction, extend between the starboard frame member 15 and port frame member 16 to form the elongated generally rectangular cradle 14.

The forward cross member 17 includes an outer tubular member 21 extending from an elbow 22 on the port frame member 16. An inner tubular member 23, having an outer diameter slightly less than the inner diameter of the outer tubular member 21 is joined to the starboard frame member 15 by elbow 24 and extends into the outer tubular member 21.

A plurality of holes 25 are provided in the inner tubular member 23 having the same spacing and alignment as corresponding holes 26 in the outer tubular member 21 such that a pin 27 can be inserted through a pair of aligned holes 25 and 26 to secure outer tubular member 21 to inner tubular member 23 and establish a fixed distance between starboard frame member 15 and port frame member 16.

The aft cross frame member 20 is constructed similarly to the forward cross member 17 and includes outer tubular member 28 joined to the port frame member 16 by elbow 29 and inner tubular member 30 joined to the starboard frame member 15 by elbow 31. Pin 32 is used to secure the outer and inner tubular member 28 and through holes 33 and 34. A tow lope 51 can be secured to eye rings 50 in elbows 22 and 24.

The aft cross member 20 also includes a tee 35 pivotably disposed on the outer tubular member 28 and a tee 36 pivotably disposed on the inner tubular member 30. A generally U-shaped tailgate 37 extends between tees 35 and 36 and generally comprises an outer L-shaped tubular member 38 and inner L-shaped tubular member 39, with the inner member 39 telescoping within the outer member 38. Each of the tees 35 and 36 include holes 40, aligned with corresponding holes in the aft cross member 20 to receive a pin 41, to position and maintain the tailgate 37 in a vertical position with respect to the cradle 14 once the personal watercraft is loaded on the cradle 14. The pin 41 would be removed for loading and unloading so that the tailgate 37 can be pivoted out of the way to a position below the cradle 14, as depicted in FIG. 1.

The intermediate cross members 18 and 19 similarly include outer tubular members 42 and 43 and inner tubular members 44 and 45, respectively. Outer tubular members 42 and 43 extend from tees 46 and 47 respectively on the port frame member 16, while inner tubular members 44 and 45 extend from tees 48 and 49 respectively on the starboard frame member 15. Each of these cross members 18 and 19 are similarly telescoping to the forward and aft cross members 15 and 16.

A plurality of tees 53, 54, and 55 are slidably and pivotably disposed on the starboard frame member 15, while tees 56, 57, and 58 are similarly disposed on the port frame member 16. Forward, intermediate, and aft telescoping starboard legs 59, 60, and 61 extend from the tees 56, 57, and 58 respectively on the starboard tubular frame 15 to the starboard skid 65 while forward, intermediate and aft telescoping port legs 62, 63, and 64 extend from tees 56, 57, and 58 on the port tubular frame 16 to the port skid 66.

Each of the starboard legs 59, 60, and 61 include an outer tubular member 70, 71, and 72 respectively extending from tees 53, 54, and 55 to telescope with inner tubular members 73, 74, and 75 which extend from stubs 76, 77, and 78 respectively on the starboard skid 65. Each of the outer tubular members 70, 71, and 72 and each of the inner tubular members 73, 74, and 75 include equally spaced and aligned holes 79 and 80 respectively to provide for the insertion of a pin 81 to position the outer tubular member with respect to the inner tubular member and establish the height of the cradle 14.

On the port side, telescoping legs 62, 63, and 64 similarly include outer tubular members 82, 83, and 84 extending from tees 56, 57, and 58 to telescope with inner tubular members 85, 86, and 87 which extend from stubs 88, 89, and 90 on the port skid 66. Telescoping forward cross member 92, having an outer tubular member 96 and inner tubular member 97, extends between tee 94 on the forward starboard leg 59 to tee 95 on the forward port leg 62. A telescoping aft cross member 93, including outer tubular member 98 and inner tubular member 99, extends between the aft starboard leg 61 and aft port leg 64. The outer and inner tubular members 98 and 99 include a plurality of equally spaced and aligned holes such that a pin 111 can be inserted therethrough to maintain a parallel relationship between the starboard legs 59, 60, and 61 and the port legs 62, 63, and 64. Both the forward cross member 92 and aft cross member 93 are offset from the direct line between the forward legs 59 and 62 and aft legs 61 and 64 respectively to provide greater stability to the stand.

As best illustrated in FIGS. 5, 6 and 7, both the starboard skid 65 and port skid 66 include a plurality of spring biased retractable wheel member. For example, starboard skid 65 includes wheel members 100, 101, 102, and 103 generally equally spaced along the length thereof. Each wheel member is mounted to the skid 56 by means of a generally L-shaped bracket 109 which extends upward and outward from the skid 65. Each member generally comprises a shaft 105 disposed in a hole through the bracket 104 and includes a saddle 106 to receive an axle 107 upon which wheel 108 is mounted. A spring 109 extends between the top of the saddle 106 and the bracket 109 to bias the wheel 108 in a position extending below the bottom of the skid 65.

The wheel 65 can be retracted to a position which does not extend below the base or bottom of the skid 65 by compressing the spring 109 between the saddle 106 and bracket 104. A plurality of holes are provided in the shaft 105 to receive a pin 110 to hold the spring 109 in a compressed position as shown in FIG. 7. A spring-biased ball 111 near the end of the pin 110 can be utilized to maintain the pin 110 in the position as shown.

The collapsible support and transport stand 10 has been described as of a tubular type construction. Depending upon the specific application and more particularly the weight of the personal watercraft, the stand may be constructed of thick walled PVC plastic tubes and fittings. Alternately, either thin walled galvanized tubular steel or anodized tubular aluminum may be utilized with the structure either threaded or welded together to form the stand 10.

With the forward cross member 92 in place between the forward starboard leg 59 and forward port leg 62 and aft cross member 93 in place between aft starboard leg 61 and aft port leg 64, the stand 10 is rigidly maintained in its operable position as illustrated in FIGS. 1, 2 and 5. In this manner the stand 10, including a personal watercraft thereon, can be moved along typical beach terrain. When a paved surface is available, the wheel members can be maintained in their extended position as members 102 and 103 are shown in FIG. 5. If rough terrain or sand is encountered, the wheel members can be positioned and maintained in the retracted position as members 100 and 101 are shown in FIG. 5. The stand 10 can be easily pulled over either type of surface by a single person by means of the pull rope 51.

When the stand 10 is not in use the pins holding the forward cross member 92 and aft cross member 93 can be removed and the starboard legs and port legs pivoted apart from one another. The legs 59, 60, 61, 62, 63, and 64 can be telescoped to their shortest length and the port legs 62, 63, and 64 and skid 66 pivoted about port frame member 16 to a position underneath the cradle 14. Similarly the starboard legs 59, 60, and 61 and skid 65 can be pivoted about starboard frame member 15 to a position underneath the pivoted port legs and skid. This collapsed arrangement is generally illustrated in FIG. 3.

In order to maintain the stand in the position of FIG. 3, the intermediate legs 60 and 63 can be provided with clips 102. For example, clip 102 can be mounted on the outer tubular member 83 of the port leg 63. The open end of clip 102 would then receive outer tubular member 71 of starboard leg 60 to maintain the legs in the position shown.

Accordingly, the collapsible support and transport stand provide a simple and economical means to remove a personal watercraft from a pick-up truck and transport the watercraft into the water, which can be accomplished by a single individual. When not in use, the stand can be collapsed into a small space for storage until use is again required.

A variety of further modifications and improvements to the collapsible support and transport stand for personal watercraft of the present invention will be apparent to those skilled in the art. Accordingly, no limitation on the invention is intended by way of the description herein, except as set forth in the appended claims.

What is claimed is:

1. A collapsible support and transport stand for personal watercraft comprising:
    an elongated support cradle extending in a substantially horizontal plane for supporting a personal watercraft, said cradle having a forward end, an aft end, a starboard side, and a port side;
    means to adjust the width of the elongated personal watercraft support cradle between the starboard side and the port side to accommodate different types of personal watercraft;
    first and second skids disposed beneath said elongated cradle, each of said skids having a plurality of spring-biased retractable wheels to extend below said skid but movable to a retracted position;
    a forward pair of legs pivotably extending from the forward end of said cradle to the forward end of said first and second skids respectively, each of said pair of forward legs pivotable from said cradle from an extended position substantially transverse to the plane formed by said cradle to a stowed, position underneath said cradle and substantially parallel to said plane;
    a forward telescoping cross brace extending between the forward pair of pivotable legs to position and maintain said forward pair of legs transverse to said cradle while in their extended position;
    an aft pair of legs pivotably extending from the aft end of said cradle to the aft end of said first and second skids respectively, each of said pair of aft legs pivotable from said cradle from an extended position substantially transverse to the plane formed by said cradle to a stowed position substantially underneath and parallel to said plane; and
    an aft telescoping cross brace extending between the aft pair of pivotable legs to position and maintain said aft pair of legs transverse to said cradle while in their extended position.

2. The collapsible support and transport stand of claim 1 wherein said elongated support cradle includes an elongated tubular starboard frame member, an elongated tubular port frame member, and a plurality of tubular cross members disposed between said starboard frame member and said aft frame member.

3. The collapsible support and transport stand of claim 2 wherein said plurality of tubular cross members comprise at least a forward cross member, an aft cross member, and at least one intermediate cross member.

4. The collapsible support and transport stand of claim 3 wherein said at least one intermediate cross member comprises two cross members for a total of four cross members between said starboard and frame member and said aft frame member.

5. The collapsible support and transport stand of claim 4 wherein said plurality of tubular cross members are telescoping.

6. The collapsible support and transport stand of claim 1 and in addition:
    an intermediate pair of legs pivotably extending from an intermediate position on said cradle between the forward and aft ends thereof to an intermediate position on said first and second skids respectively, each of said pair of intermediate legs being pivotable from said cradle from a first position substantially transverse to said cradle to a stowed position substantially underneath and parallel to said cradle; and
    an intermediate telescoping cross brace extending between the intermediate pair of pivotable legs to position and maintain said intermediate pair of legs in the first position transverse to said cradle.

7. The collapsible support and transport stand of claim 6 wherein each of said forward, aft and intermediate pairs of legs are telescoping.

8. The collapsible support and transport stand of claim 7 wherein each of said forward, aft and intermediate telescoping cross braces are offset from a direct line between said forward, aft and intermediate pairs of legs respectively.

9. The collapsible support and transport stand of claim 3 and in addition a tubular tailgate pivotably disposed on said aft cross member of said cradle to extend upward from said cradle in a first position and downward from said cradle in a second position.

10. The collapsible support and transport stand of claim 9 and in addition a tow rope secured to the forward end of said cradle.

11. The collapsible support and transport stand of claim 8 wherein said one of said pair of intermediate legs includes clip means disposed thereon to secure said one of said pair of intermediate legs to the other of said pair of intermediate legs to maintain said forward, aft and intermediate pairs of legs and said first and second skids in a stowed position underneath said cradle.

12. The collapsible support and transport stand of claim 8 and in addition, a plurality of spring-biased retractable wheels disposed on each of said first and second skids.

13. A collapsible support and transport stand for personal watercraft comprising:
    an elongated support cradle extending in a substantially horizontal plane for supporting a personal watercraft, said cradle having a starboard side and a port side;
    means to adjust the width of the elongated personal watercraft support cradle between the starboard side and the port side to accommodate different types of personal watercraft;
    starboard and port skids disposed beneath said elongated cradle, each of said skids having a plurality of spring-biased retractable wheels to extend below said skid but movable to a retracted position;

a plurality of starboard legs pivotably extending from the starboard side of said cradle to the starboard skid, each of said plurality of starboard legs telescoping in length and pivotable from the starboard side of said cradle from an extended position substantially transverse to the plane formed by said cradle to a stowed position underneath said cradle and substantially parallel, to said plane;

a plurality of port legs pivotably extending from the port side of said cradle to the port skid, each of said plurality of port legs telescoping in length and pivotable from the port side of said cradle from an extended position substantially transverse to said cradle to the plane formed by a stowed position substantially underneath and parallel to said plane; and a plurality of telescoping cross braces extending between the plurality of starboard legs and the plurality of port legs to position and maintain said starboard legs substantially parallel to said port legs while in their extended position.

14. The collapsible support and transport stand of claim 13 wherein said plurality of starboard legs is three legs and said plurality of port legs is three legs.

15. The collapsible support and transport stand of claim 14 wherein each of said plurality of starboard legs comprises an outer tubular member pivotably disposed on the starboard side of said cradle and an inner tubular member affixed to the starboard skid to telescope within said outer tubular member; each of said outer and inner tubular members having a plurality of equally spaced holes therein, and a pin to be inserted through aligned holes in said outer and inner tubular members to secure the inner member to said outer member; and each of said plurality of port legs comprises an outer tubular member pivotably disposed on the port side of said cradle and a inner tubular member affixed to the port skid to telescope within said outer tubular member, each of said outer and inner tubular members having a plurality of equally spaced holes therein, and a pin to be inserted through aligned holes in said outer and inner tubular members to secure the inner member to said outer member.

16. The collapsible support and transport stand of claim 15 wherein each of said telescoping cross braces comprises an outer tubular member affixed to a port leg and an inner tubular member affixed to a starboard leg to telescope within said outer tubular member, each of said outer and inner tubular members having a plurality of equally spaced holes therein, and a pin to be inserted through aligned holes in said outer and inner tubular members to secure the inner member to said outer member.

17. The collapsible support and transport stand of claim 16 wherein telescoping cross braces are offset from direct line between the legs to which said cross brace is affixed.

18. The collapsible support and transport stand of claim 17 and in addition a tow rope secured to the forward end of said cradle.

19. The collapsible support and transport stand of claim 18 and in addition a tubular tailgate pivotably disposed on the aft end of said cradle.

* * * * *